May 20, 1924. Re. 15,843
G. STIRK ET AL
DIRECT CURRENT MOTOR AND GENERATOR
Original Filed Sept. 18, 1920
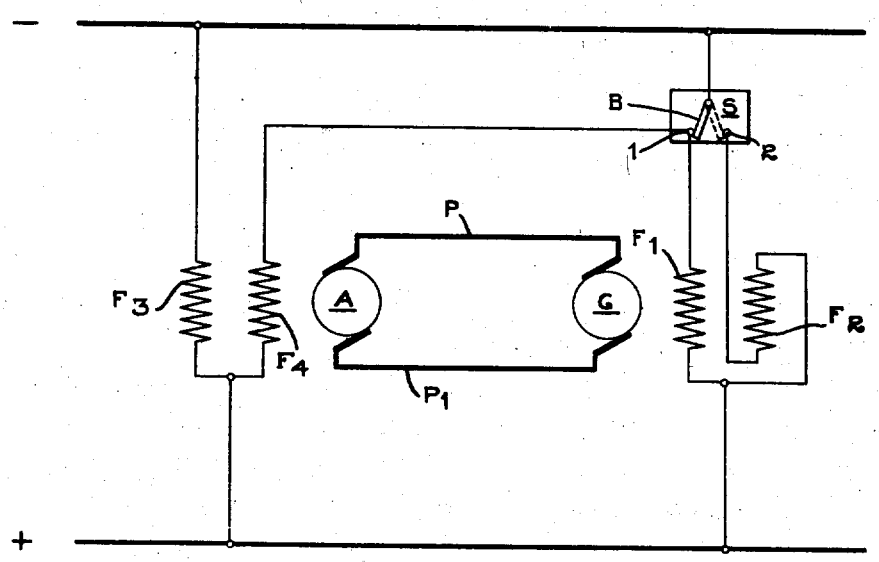
WITNESSES:
C. N. Cochran
H. H. Keith
INVENTORS
Greenwood Stirk and
John G. Stirk.
BY
Wesley G. Carr
ATTORNEY Reissued May 20, 1924. Re. 15,843

UNITED STATES PATENT OFFICE.

GREENWOOD STIRK AND JOHN GEORGE STIRK, OF HALIFAX, ENGLAND.

DIRECT-CURRENT MOTOR AND GENERATOR.

Original No. 1,407,958, dated February 28, 1922, Serial No. 411,227, filed September 18, 1920. Application for reissue filed January 10, 1923. Serial No. 611,824.

*To all whom it may concern:*

Be it known that we, GREENWOOD STIRK and JOHN G. STIRK, subjects of the King of Great Britain, and residents of Halifax, in the county of York, England, have invented a new and useful Improvement in Direct-Current Motors and Generators, of which the following is a specification.

Our invention relates to systems of motor control and it has particular relation to such systems as are employed in connection with vehicles, rolling mills, planers and similar machines.

The object of our invention is to simplify the connections and switching equipment of a system of control comprising a separately excited direct-current motor and a generator for controlling the motor.

It has been common practice to accomplish reversal of polarity of a generator and the corresponding direction of rotation of a motor in circuit therewith by reversing the generator field connections. It is proposed to accomplish the desired result by dividing separately excited field windings of both motor and generator into sections and alternately exciting these windings by means of a single-pole, double-throw switch. Magnetically operable switches or contactors may be employed in place of directly controlling the circuits through the single-pole, double-throw switch.

Considerable economies in switches and apparatus may be achieved in accordance with our invention and the system is especially suitable for reversing-motor drives.

Our invention will be described in connection with the accompanying drawing, which is a diagrammatic representation of circuits and apparatus embodying our invention.

A is the armature of an electric motor and G the armature of a generator connected in circuit therewith. F1, F2 are two sections of separately excited field windings of the generator and F3, F4 are two sections of the separately excited field windings of the motor. Both windings F1, F2, being, in this case, independently excited or connected across the positive and negative mains, have reversed connections connected with the positive main and to contact members 1 and 2 of a single-pole, double-throw switch S that is connected to the negative conductor. Field winding F3 is connected permanently across the mains while winding F4 is connected between the positive main or conductor and contact member 1 of switch S.

Assuming the generator to be in motion and operated by any convenient prime mover, the switch bar B being in contact with 1 as shown in the drawing and direct current mains + and — being energized, a circuit is completed from the positive main through field winding F1 and switch arm B to the negative main. The generator consequently generates an electromotive force and we may, therefore, assume conductors P and P1 as positive and negative, respectively. Motor field winding F4 is simultaneously energized from the positive and negative conductors through the arm B, and the motor rotates in a clockwise direction at minimum speed corresponding to maximum field strength.

To reverse the polarity of the generator and the direction of rotation of the motor, the arm B is actuated to engage contact member 2, as shown in dotted lines. A circuit is completed through field winding F2 whereupon the polarity of conductors P and P1 becomes reversed. The motor field remains unaltered in polarity but is reduced in strength because of the fact that field winding F4 is not energized, consequently, the motor rotates anti-clockwise and at an increased speed.

Regulators may be introduced in either motor or generator field to widen the speed variation, and supplementary switching equipment may be introduced to alternatively increase and decrease speeds if desired, but these are irrelevant to the invention and have not been shown.

To one skilled in the art, our system will present many valuable points worthy of consideration, chief among which is the matter of simplicity by the elimination of many complicated control devices. Adjustable speed motors of the type herein described have been successfully employed in hoisting applications and may be considered standard machines. Also, since the generator field windings are intermittently energized, it is unnecessary to provide for windings of special design.

As previously mentioned, contactors or magnetically operated switches may be employed if desired, but these also have not been illustrated in order that the essential features of our invention may not be obscured.

We claim as our invention:

1. A direct-current motor and generator connected in series, each machine having separately excited field windings comprising two sections, those of the generator having reversed circuit connections, and a single-pole change-over switch connected to the field windings of the generator and to the negative main, the sections of the motor field winding having circuit connections in agreement, but one of them being permanently in circuit and the other being connected to the singe-pole change-over switch, whereby on operating the said switch to reverse the polarity of the generator and the direction of rotation of the motor, a circuit is alternately opened and closed through the switch-connected section to vary the speed of the motor.

2. The combination with a motor and a generator having separately excited field-magnet windings, severally comprising two portions, of a single-pole double-throw switch for energizing the motor winding and only one portion of the generator winding simultaneously therewith.

3. The combination with a motor and a generator having separately excited field-magnet windings, severally comprising two portions, of a single-pole double-throw switch for energizing the motor winding and only one portion of the generator winding simultaneously therewith and for de-energizing a portion of said motor winding.

4. The combination with a motor and a generator having separately excited field-magnet windings, severally comprising two portions, of a single-pole double-throw switch for energizing the motor winding and only one portion of the generator winding simultaneously therewith, for deenergizing a portion of said motor winding and for energizing another portion of said generator winding.

5. The combination with a motor having a divided field-magnet winding for controlling the speed of the motor, of a source of energy comprising a generator, and a single-pole double-throw switch for reversing the direction of current through the generator and for controlling the excitation of one portion of said motor winding.

6. The combination with a motor and a generator having their armatures connected in a closed circuit, of a pair of field-magnet windings therefor normally short-circuited and means for simultaneously exciting said windings.

7. The combination with a motor and a generator having their armatures connected in a closed circuit, of a pair of separately excited field-magnet windings therefor normally short-circuited and means for simultaneously exciting said windings.

8. The combination with a motor and a generator having their armatures connected in a closed circuit, of a pair of separately excited field-magnet windings therefor normally short-circuited and a single-pole switch for controlling the excitation of said windings.

9. The combination with a motor and a generator electrically connected therewith and having separately excited field-magnet windings, of a single-pole double-throw switch for effecting maximum field excitation of the motor in one position and a predetermined field excitation of the generator, and in another position effecting minimum field excitation of said motor together with a reversal of field excitation of said generator.

10. The combination with a motor and a generator having armatures electrically connected, of a divided field-magnet winding for the generator and means comprising a single-pole double-throw switch for alternately energizing portions of said winding and for simultaneously therewith varying the motor speed.

In testimony whereof, we have hereunto subscribed our names this 20th day of December, 1922.

GREENWOOD STIRK.
JOHN GEORGE STIRK.